United States Patent [19]
Tsuchida et al.

[11] Patent Number: 5,776,207
[45] Date of Patent: Jul. 7, 1998

[54] LEAD ACID STORAGE BATTERY AND METHOD FOR MAKING SAME

[75] Inventors: Kensaku Tsuchida, Chigasaki; Takashi Hattori, Toyohashi; Rikio Miyagi, Kosai, all of Japan

[73] Assignee: Matsushita Electric Industrial Co., Ltd., Osaka, Japan

[21] Appl. No.: 506,522

[22] Filed: Jul. 25, 1995

[30] Foreign Application Priority Data

Mar. 20, 1995 [JP] Japan ............................. 7-060768

[51] Int. Cl.[6] ............................. H01M 6/00; H01M 4/56
[52] U.S. Cl. ........................ 29/623.1; 29/623.5; 429/225
[58] Field of Search ..................... 29/623.1, 623.5; 429/225

[56] References Cited

U.S. PATENT DOCUMENTS

| | | | |
|---|---|---|---|
| 2,978,762 | 4/1961 | McAlpine | 22/58 |
| 3,087,005 | 4/1963 | Sabatino et al. | 136/176 |
| 3,395,748 | 8/1968 | Tiegel | 164/103 |
| 4,160,071 | 7/1979 | Parker | 429/211 |
| 4,573,514 | 3/1986 | Wolf et al. | 164/4.1 |
| 5,206,987 | 5/1993 | Mix | 29/623.1 |

FOREIGN PATENT DOCUMENTS

| | | |
|---|---|---|
| 640025 | 4/1962 | Canada. |
| 2336807 | 7/1977 | France. |
| 55-148366 | 11/1980 | Japan. |
| 58-250432 | 12/1983 | Japan. |
| 60-53 | 1/1985 | Japan. |
| 60-138848 | 7/1985 | Japan. |
| 60-232666 | 11/1985 | Japan. |
| 60-246556 | 12/1985 | Japan. |
| 3-133055 | 6/1991 | Japan. |
| 6-290770 | 10/1994 | Japan. |

OTHER PUBLICATIONS

Patent Abstracts of Japan, vol. 94, No. 010 & JP-A-06 290770 (Japan Storage Battery Co Ltd), 18 Oct. 1994.

Chen Z W, et al; "Joining of Lead-Antimony and Lead-Calcium Alloy Lugs by a Laboratory Cast-on Strap Process"; Oct. 1, 1993; Journal of Power Sources, vol. 46, No. 2/03, pp. 311-326, XP000483137.

Patent Abstracts of Japan, vol. 017, No. 653 (E-1469), 3 Dec. 1993 & JP-A-05 217572 (Japan Storage Battery Co Ltd), 27 Aug. 1993.

Patent Abstracts of Japan, vol. 017, No. 668 (E-1473), 9 Dec. 1993 & JP-A-05 225967 (Japan Storage Battery Co Ltd), 3 Sep. 1993.

Patent Abstracts of Japan, vol. 013, No. 354 (E-802), 8 Aug. 1989 & JP-A-01 115059 (Shin Kobe Electric Mach Co Ltd), 8 May 1989.

Patent Abstracts of Japan, vol. 009, No. 178 (E-330), 23 Jul. 1985 & JP-A-60 049559 (Yuasa Denchi KK), 18 Mar. 1985.

Primary Examiner—Kathryn L. Gorgos
Assistant Examiner—Edna Wong
Attorney, Agent, or Firm—Watson Cole Stevens Davis, P.L.L.C.

[57] ABSTRACT

The invention provides a method for making a thin strap in a stable molten state in producing a plate group for a lead acid storage battery by integrally welding lugs of a plurality of plates of the same polarity by cast-on-strap process. According to the method, the strap is formed in the following manner. A molten lead is fed in a strap forming tool surrounded by an induction heating coil; control of the temperature of the molten lead and preheating of the tips of the plate lugs are carried out by the induction heating coil; the tips of the lugs is dipped in the molten lead and kept at a given temperature; and, thereafter, the mold is forcedly cooled to solidify the molten lead.

19 Claims, 4 Drawing Sheets

LEAD ACID STORAGE BATTERY AND METHOD FOR MAKING SAME

BACKGROUND OF THE INVENTION

The present invention relates to a strap and, more particularly, to an improvement of a method for forming it by cast-on-strap process.

Prior Art

As for lead acid storage batteries, there have been various proposals on the process of parallel connection of plates of the same polarity in the same cell compartment by inserting a plate group in the cell compartments of a monoblock container in which a plurality of cell compartments are integrally provided and a method of series connection of plate groups different in polarity in adjacent cell compartments through partition walls in the container.

For example, there is a cast-on-strap process as one of processes for formation of straps for parallel connection of plates of the same polarity in lead acid storage batteries. Typical examples of formation of straps by such process will be explained below.

A plate group comprising positive plates, negative plates and separators is put in each cell compartment of a container in such a state that the plate lugs project from the container and the container is turned upside down so that the lug of each plate faces downward. A mold for forming a strap is placed under the container held upside down and a given amount of molten lead is fed in this mold. The tips of the plate lugs are dipped in this molten lead and are molten together with the molten lead. Then, the molten lugs and the molten lead are solidified together, thereby to form a strap and simultaneously bond the plate lugs to each other. The mold for forming the strap is heated to and kept at a temperature by a heater provided in the mold and by a cooling water so that the molten lead fed to the mold can be kept at good molten state, and after the molten lead and the plate lugs are molten together, the mold can be cooled.

When a strap is formed by the above process, the mold is previously heated, and lead which is kept in molten state by heating to a temperature higher than the mold temperature is fed in the mold. The temperature of the fed molten lead begins to lower immediately after being poured into the mold due to the diffusion of heat to the atmosphere and the mold. Furthermore, when the tips of the lugs of the plate group are dipped in the molten lead, the temperature of the lugs rises while the temperature of the molten lead in the mold further rapidly lowers due to the conduction of heat from the molten lead to the lugs. After they are left in this state for a given period, when the temperature of the molten lead lowers to the solidification temperature, solidification starts and the strap is formed.

In addition to the cast-on-strap process mentioned above, there is a process described in JP 60-138848A which comprises allowing the plate lugs and a solder to contact with each other in a connecting tool and melting the solder by high-frequency heating or induction heating to solder the tips of the plate lugs, whereby parallel connection of plates of the same polarity in the same cell compartment and series connection of the plate groups of different polarity in the adjacent two cell compartments are simultaneously carried out. According to this process, a solder which is lower in melting point than the lead alloy used in the above cast-on-strap process is used to weld the plate lugs. Therefore, cost for strap increases due to the use of solder.

However, the cast-on-strap process has the following various problems.

(1) The control of welding conditions for welding of the plate lugs with the strap in formation of the strap is carried out only by the temperature of molten lead fed in the mold. Furthermore, since the strap is formed utilizing only the heat energy of the molten lead fed in the mold, when the number of the plates increases, much heat energy is needed in order to obtain a sufficient bond strength between the plate lugs and the strap, which causes increase in the amount of molten lead used as a source for the heat energy. As a result, it becomes difficult to form a strap of small and thin type.

(2) At the time of dipping the plate lugs in the molten lead fed in the mold, the surface of the molten lead fluctuates, and since the molten lead is cooled and solidified before a sufficient time is given for the surface returning to the smooth state, the surface of the strap waves, and thickness of the strap becomes uneven.

(3) If the plate lugs are not positioned at equal intervals, the heat balance between the plates is lost, resulting in variation in welding state of the plates and the strap.

(4) Defects such as cavity and shrinkage are apt to occur inside the strap.

(5) Flux coated on the surface of the plate lugs decomposes with heat and gasified. The solidification completes in a short time before the generated gas is released to the outside, and, hence, the gas remains as voids in the strap.

As stated above, the formation of strap by the conventional cast-on-strap process has many problems. The main reason therefor is that the heat source for welding of plates and strap is only the molten lead fed from the outside.

In order to solve the problems, it is necessary to instantaneously and accurately supply the energy required for welding from the outside. For example, in the case of the mold having a heater therein, the mold per se becomes a great heat block and it is very difficult to perform the control of rapid rising of temperature and the accurate control of temperature of the melt.

The cooling and solidification of the molten lead for formation of strap start from the portion which contacts with the plate lugs and the mold. Therefore, the central portion finally solidifies, and defects such as cavity and shrinkage occur in the central portion owing to the difference in solidification rate.

Furthermore, preheating of the plate lugs is carried out for improving weldability at the time of formation of strap and for removing flux with drying. For this purpose, equipments such as hot-air heating devices are needed.

SUMMARY OF THE INVENTION

The present invention has solved the problems by providing a method for forming a strap for plate groups by cast-on-strap process wherein maintenance of molten state of pure lead or lead alloy fed to a mold from the outside for formation of the strap and pre-heating of the lugs of plate groups are carried out by an induction heating device, and after the plate lugs are melt bonded to molten lead or lead alloy used for formation of the strap, a coolant such as water is sprayed from the underside of the mold to carry out forced cooling. The present invention further provide the strap formed in this way.

According to the present invention, a strap is formed with carrying out accurate control of temperature of molten lead or lead alloy and using an induction heating device as a heating source. Therefore, even when the number of the plates of the same polarity is great, for example, more than ten, control of the temperature can be accurately carried out and it becomes possible to form the strap of thin thickness of about 2/3 of the strap formed by the conventional cast-on-strap process, and, furthermore, the strap formed is satisfactory in strength and corrosion resistance. Accordingly, amount of lead or lead alloy used can be reduced as compared with the conventional method.

Moreover, by carrying out the cooling by spraying water as a coolant against the mold from the underside, solidification of molten lead alloy for formation of strap rapidly proceeds from the lower part of the mold and occurrence of poor weld can be prevented.

DESCRIPTION OF THE INVENTION

An example of the present invention will be explained below.

In the following example explained referring to the accompanying drawings, formation of a strap of a plate group consisting of nine positive plates and ten negative plates having a lug of 10 mm in length, 1.5 mm in thickness and 10 mm in length and series connection of current collector of plate groups of different polarity are simultaneously carried out using an induction heating device of 5 kW in output power and a grid comprising a lead-calcium-tin alloy.

Figure 1A:
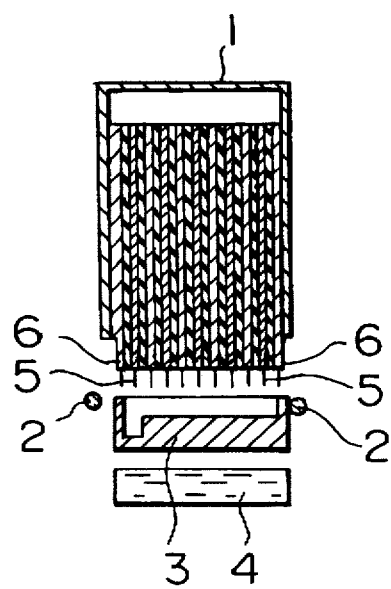
FIG. 1(a) is a cross sectional view of a tool for forming a strap of lead acid storage battery according to the present invention.
Figure 1B:
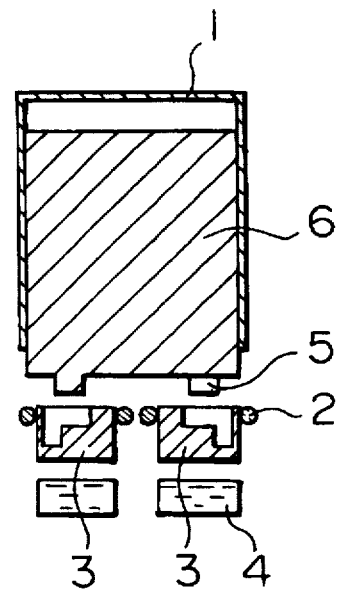
FIG. 1(b) is a longitudinal sectional view of the tool shown in FIG. 1(a).
Figure 2:
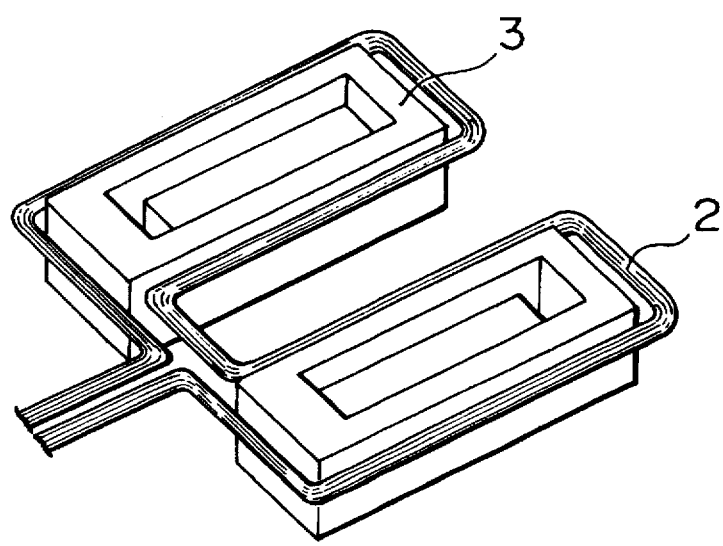
FIG. 2 is an oblique view of a tool for the formation of strap used in the present invention.

As shown in FIG. 1(a) and FIG. 1(b), a plate group consisting of positive plates 5, negative plates 6 and separators is inserted in each of the cell compartment of monoblock container 1 comprising a synthetic resin in such a state as the upper part of the plate group being exposed outside the container, and this container is turned upside down by 180° and held so that the plate lugs face downward as shown in FIG. 1(a) and FIG. 1(b). Under the plate lugs, a stainless steel mold 3 for formation of strap provided with induction heating coil 2 is placed opposing the plate lugs. The induction heating coil 2 is provided spacing about 2 mm from the tool and surrounding the mold 3 so that heat is uniformly generated from the mold 3. The mold 3 for formation of the strap is preferably made of a heat-resistant material high in permeability and excellent in heat conduction. Moreover, a shower spraying means 4 for water cooling is provided under the mold 3.

Figure 4:
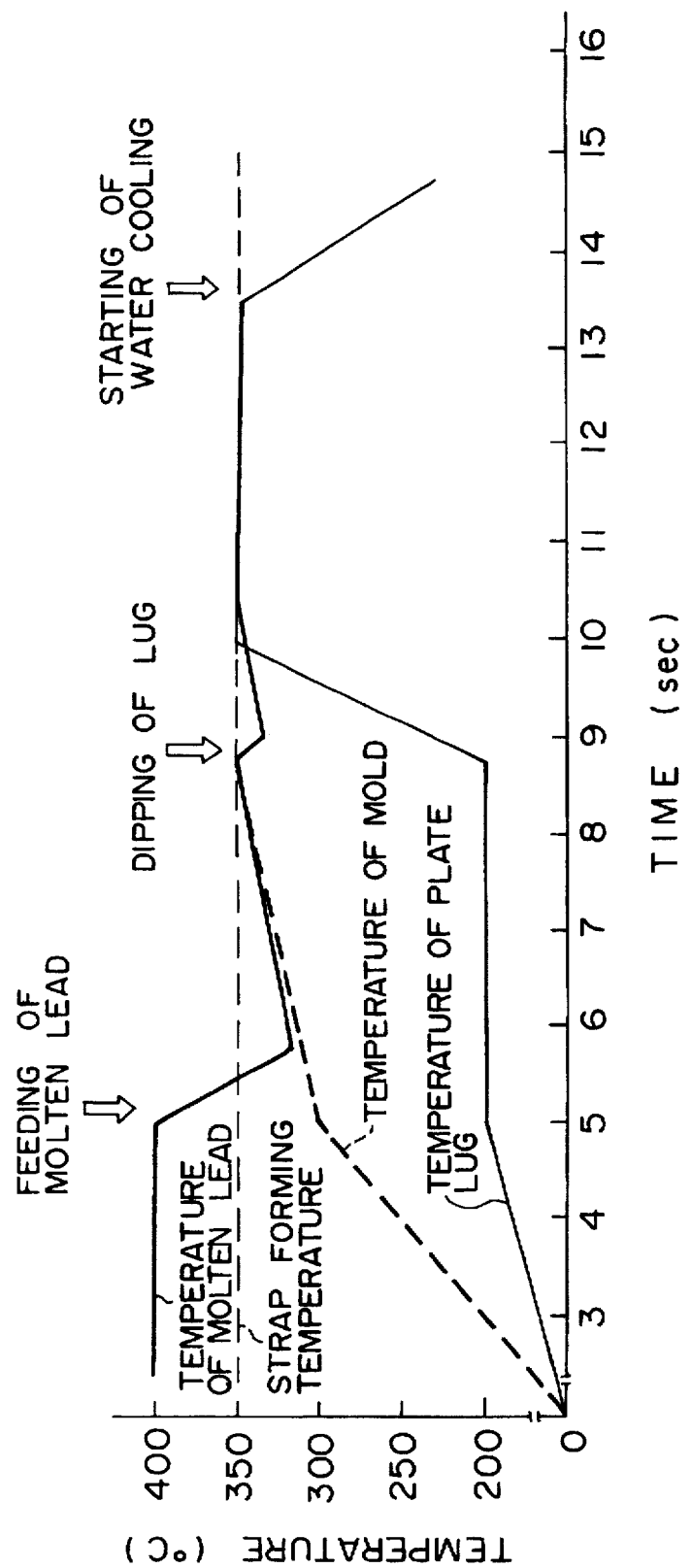
FIG. 4 is a graph which shows change of temperature in the system in the Example of the present invention.

By passing an electric current through the induction coil 2 with an initial applied power of 5 kW (200 V, 25 A) and a frequency of 120 kHz, the mold 3 per se surrounded by the coil can generate heat of up to about 300° C. in about 5 seconds (FIG. 4). Control of the heating state is carried out by detecting the heating state in accordance with signals from a temperature detector, with which the mold 3 is equipped, and by changing the output to be applied to the coil from the electric source. A flux is coated on the lugs of the plate group and the tips of the lugs are positioned at about 3 mm above the mold 3 and are kept at that position. As a result, the lugs of the plate group also generate heat with line of magnetic force of the induction coil 2 and the temperature of the tips of the lugs rise to near 200° C. When a molten lead obtained by heating pure lead to 400° C. is fed into the mold 3 for formation of strap, the temperature of the molten lead lowers to near 310° C. However, even after the molten lead is fed, the molten lead is again heated to the preset temperature of 350° C. in about 3 seconds by passing an electric current through induction coil 2 to cause the mold 3 per se to generate heat. When the temperature of the molten lead reaches the preset temperature, the plate lugs kept above the mold 3 are dipped in the molten lead in the mold 3.

Simultaneously with the tips of the lugs being inserted, the temperature of the molten lead lowers about 10° C., but rises again to 350° C. of the preset temperature in about 1.5 seconds due to heat generation of the mold 3 caused by line of magnetic force from the coil 2. After the temperature of the molten lead has reached the preset temperature and after lapse of further 3 seconds, passing of electric current through the induction coil 2 is stopped. At the same time, water is sprayed against the underpart of mold 3 from cooling shower spraying means 4 for 3 seconds to forcedly cool the mold 3 and the strap from the underside. By carrying out a series of these steps, the formation of strap for plate group of the same polarity in the same cell compartment and the series connection between the collector parts of the plates of different polarity adjacent through partition walls of the container are completed.

Figure 3:
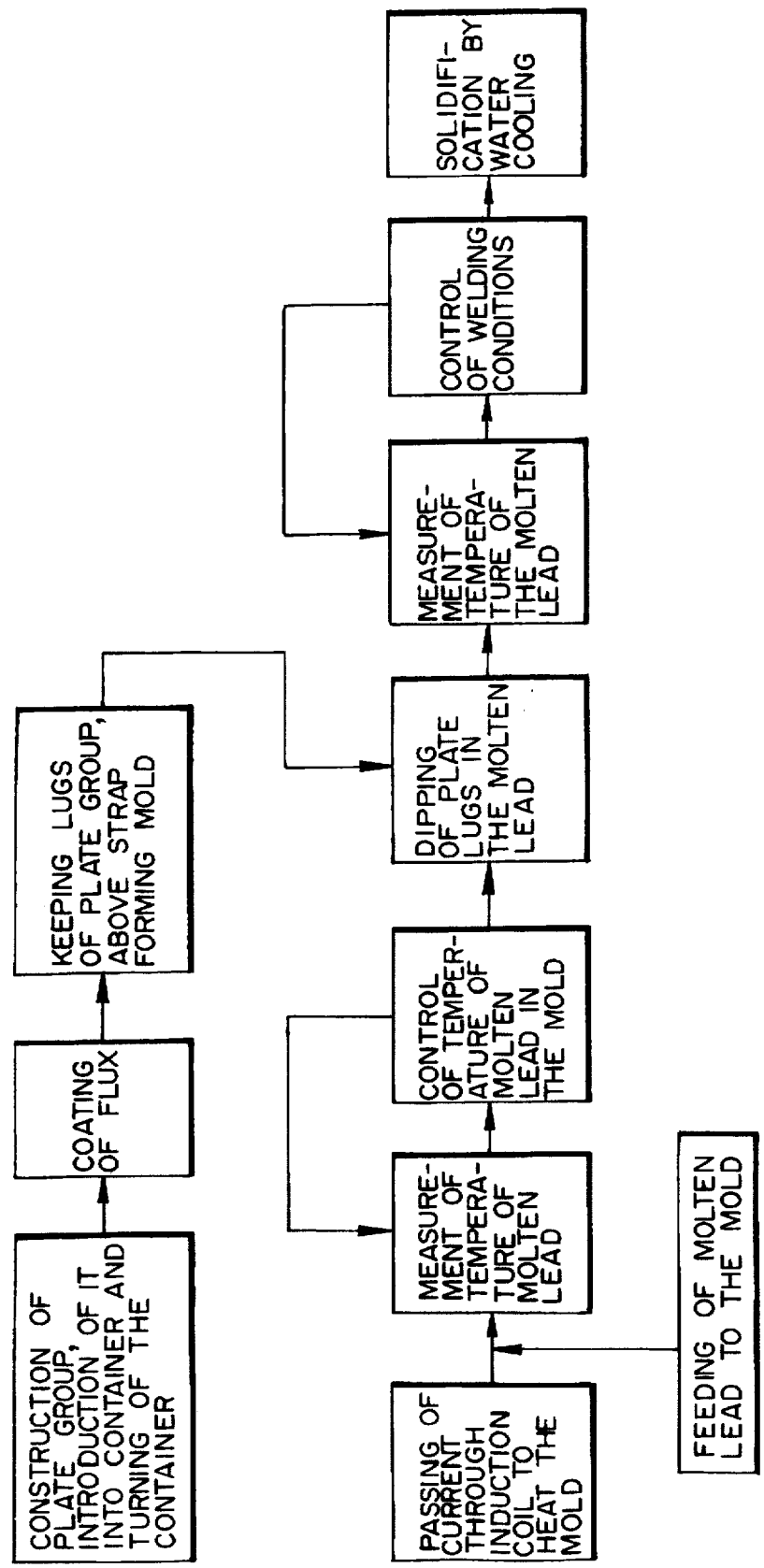
FIG. 3 is a flow chart of the steps in the Example of the present invention.

FIG. 3 shows the series connection step of the lugs of the plate group of the same polarity in the same cell compartment and FIG. 4 shows the change of temperature with time during the step. According to the present invention, not only the heating of the molten lead to the preset temperature can be carried out instantaneously in 3-5 seconds, but also the heating time after dipping of the tips of the lugs of the plate group can be optionally controlled. Therefore, rapid decrease of temperature of the molten lead when the tips of the lugs of the plate group are dipped in the molten lead in the strap forming tool can be inhibited and, thus, welding of the strap and the tips of the lugs can be performed under the conditions of small fluctuation in the temperature. Furthermore, even when the lugs of the plates are not arranged at equal intervals, balance of heat applied to each plate can be made uniform by controlling the molten state by heating and, as a result, weld strength with no fluctuation can be obtained. Moreover, after the lugs are dipped in the tool, good molten state of lead or lead alloy can be maintained by induction heating, and, therefore, it becomes possible to ensure the time necessary for the waving of the surface of the molten lead caused by dipping of the lugs to return to a smooth surface, and, as a result, the thickness of the strap can be made uniform. Furthermore, even if the flux coated on the surface of the lugs decomposes with heat to generate a gas, since the molten lead does not immediately solidify, the gas is not trapped in the strap and is smoothly released. Therefore, the gas does not remain in the strap as voids after formation of the strap. Moreover, rapid decrease of the temperature of the molten lead can be prevented by preheating the lugs by keeping them facing downward above the strap forming tool. In addition, by spraying water just under the strap forming tool to forcedly cool the tool, the texture inside the strap becomes fine and, thus, formation of defects such as cavity and shrinkage in the central portion of the strap caused by ununiform cooling and solidification can be prevented. In this example, formation of the strap was carried out in normal atmosphere, and when this is carried out in an inert gas atmosphere, oxidation of the surface portion of strap forming alloy in molten state can be prevented and the strap can be kept in more preferred state.

Figure 5:
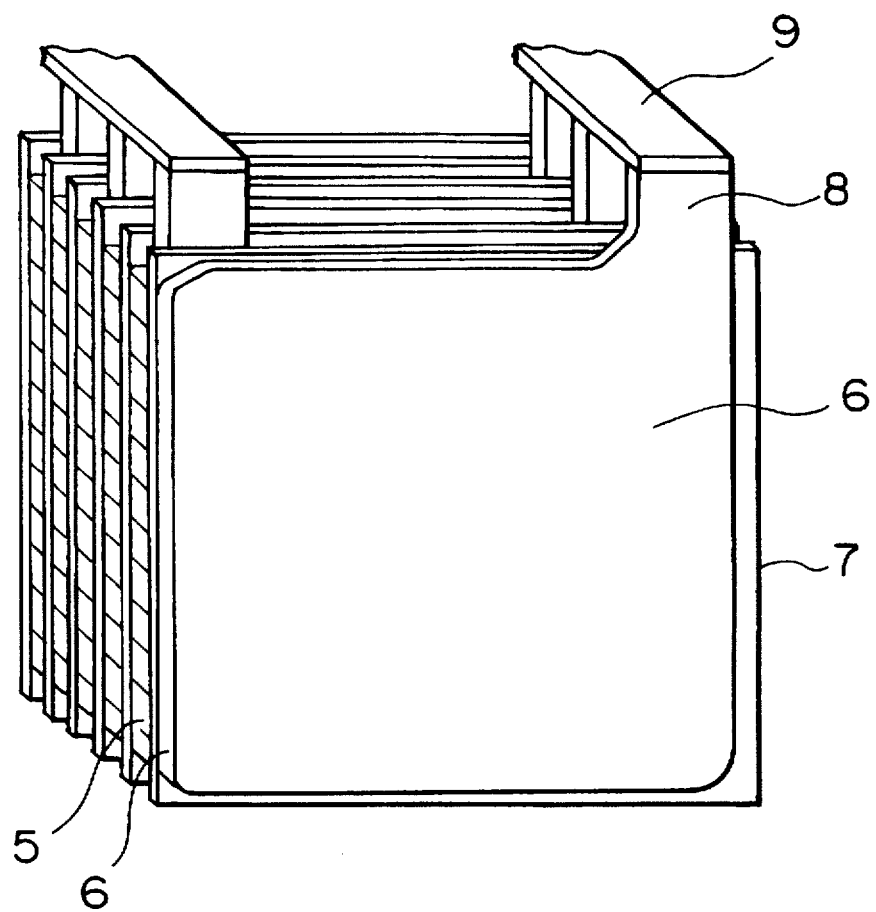
FIG. 5 is an external view of the strap of the present invention.

The strap 9 shown in FIG. 5 which was produced by the present invention has a length of 60 mm, a width of 13 mm and a thickness of 5 mm, and is thin and has a uniform thickness. Observation of the section of the welded portion of the strap and the plate lugs showed that when the plate lugs were dipped in the molten lead at a depth of 3 mm, the portion of about 1 mm from the tip of the lug was in melt-bonded state, and the remainder portion of 2 mm was sore, but retained the shape of lug. Furthermore, a fillet (thick-wall) was sufficiently formed at the intersection of the plate lug and the strap, and no voids were seen.

In this example, explanation is made of using pure lead as a material for forming the strap. However, a strap can be similarly formed by using a lead alloy. Furthermore, the similar effects can also be obtained when a lead alloy other than the lead-calcium-tin alloy is used as a grid alloy. Furthermore, in this example, a strap forming mold made of a stainless steel was used, but a mold made of brass or ceramic coated with a metal thin film may also be used. The preset temperature of the strap forming mold, the time of passing of electric current through coil and the cooling condition of the tool vary depending on the composition of the strap alloy used, construction of the plate group, and shape of the strap and the tip of the lug, and optimum values thereof can be easily found.

As explained above, according to the present invention, it becomes possible to easily carry out the formation of the strap and the connection of the strap to the lugs of a plurality of plates of the same polarity contained in the cell compartment of the container.

Moreover, the molten state of the strap forming material is accurately controlled by using an induction coil and, further, the thickness of the strap is made thin, whereby the amount of lead used can be reduced and the weight of batteries can be greatly decreased. Further advantages are improvement in productivity and reduction of cost for production of lead acid storage batteries.

What is claimed is:

1. A method for producing a lead acid storage battery by integrally connecting lugs of a plurality of plates of the same polarity placed in a cell compartment of a container to a strap by a cast-on-strap process comprising, heating a strap forming mold by induction heating to a first temperature at least prior to feeding pure lead or a lead alloy in a molten state to the mold, feeding the pure lead or lead alloy in the molten state to the strap forming mold heated by induction heating, induction heating said mold which contains molten lead or lead alloy to achieve a second temperature at which the pure lead or lead alloy is molten, then partially inserting the lugs of the plates in the molten pure lead or lead alloy and induction heating the mold while it contains the molten lead or lead alloy and inserted portion of said lugs to a third temperature and maintaining the third temperature to melt at least the tips of the lugs to form a melt, and then force cooling the entire melt by spraying with liquid coolant against the mold underside to form the strap and integrally connect the lugs to the strap.

2. A method according to claim 1, wherein the induction heating is carried out by applying an electric current with a frequency of 20-150 kHz to a coil provided surrounding the strap forming mold, and control of the heating state is carried out by an electric source adjusted by a signal from a temperature detector with which the strap forming mold is equipped.

3. A method according to claim 1, wherein the forced cooling of the strap forming mold and the melt comprises spraying coolant against an underpart of the strap forming mold.

4. The method of claim 3, wherein the forced cooling comprises spraying coolant against the underpart of the mold for about 3 seconds.

5. The method of claim 3, wherein the forced cooling comprises spraying water against the underpart of the mold for about 3 seconds.

6. The method of claim 3, wherein the forced cooling cools the melt at a rate of about 100° per second during a first second of melt cooling.

7. A method according to claim 1, wherein the formation of the strap is carried out in an inert gas atmosphere.

8. A method according to claim 1, wherein the strap forming mold is made of a stainless steel.

9. A method according to claim 1, wherein the tips of the plate lugs are preheated by induction heating and then inserted into the molten lead or lead alloy in the strap forming mold.

10. The method of claim 9, wherein the tips of the plate lugs and the molten lead or lead alloy are heated by a same source of induction heating prior to immersing the lugs into the molten lead or lead alloy.

11. The method of claim 9, wherein the tips of the plate lugs are directly above the molten lead or lead alloy during the heating by the same source of induction heating prior to immersing the lugs into the molten lead or lead alloy.

12. The method of claim 1, wherein the strap is formed to have a thickness of about 5 mm.

13. The method of claim 1, wherein the molten lead or lead alloy is stationary in the mold.

14. A method for producing a lead acid storage battery by integrally connecting lugs of a plurality of plates of the same polarity placed in a cell compartment of a container to a strap by a cast-on-strap process which comprises applying an electric current with a frequency of 20-150 kHz to a coil provided surrounding a strap forming mold made of a stainless steel to allow the strap forming mold to generate heat by induction heating to a first temperature, feeding pure lead or a lead alloy in molten state in the strap forming mold, heating the mold and molten pure lead or lead alloy contained therein to a second temperature at which the pure lead or lead alloy is molten, inserting a part of the lugs of the plates preheated by induction heating in the molten pure lead or lead alloy, again heating the whole mold by the induction heating to a third temperature and maintaining the third temperature for a given period to melt at least the tips of the lugs together with the molten pure lead or lead alloy, and then, forcedly cooling the whole mold by spraying a coolant from a coolant spraying means provided under the mold.

15. The method of claim 14, wherein the tips of the lugs are heated by induction heating prior to immersing the lugs into the molten lead or lead alloy.

16. The method of claim 14, wherein the molten lead or lead alloy is stationary in the mold.

17. The method of claim 16, wherein the molten lead or lead alloy is stationary in the mold.

18. The method of claim 16, wherein the tips of the plate lugs are positioned directly above the molten lead or lead alloy and are induction heated by the same source of induction heating used in steps (a) and (c), prior to inserting the lugs into the molten lead or lead alloy in step (d).

19. A method for producing a lead storage battery by integrally connecting lugs of a plurality of plates of the same polarity placed in a cell compartment of a container to a strap by a cast-on-strap process comprising:

(a) heating a strap forming mold by induction heating to about 300° C. prior to feeding pure lead or lead alloy in a molten state to the mold;

(b) feeding the pure lead or lead alloy at a temperature of about 400° C. into the strap forming mold;

(c) heating said mold and molten pure lead or lead alloy contained therein to about 350° C. by induction heating; and (d) partially inserting the lugs of the plates in the 350° C. pure lead or lead alloy to melt at least the tips of the lugs to form a melt, wherein the temperature of the mold initially drops upon insertion of the lugs, the mold and the molten pure lead or lead alloy are then heated to 350° C. by induction heating and the temperature is maintained for about 3 seconds by induction heating at about 350° C. to cause the plate lugs to begin to melt, and then, just after said 3 seconds of induction heating, forcedly cooling the mold from about 350° C. to about 150° C. in 3 to 5 seconds by water spraying the underside of the mold to convert the molten lead or lead alloy to solid lead or lead alloy.

* * * * *